United States Patent Office 2,913,502
Patented Nov. 17, 1959

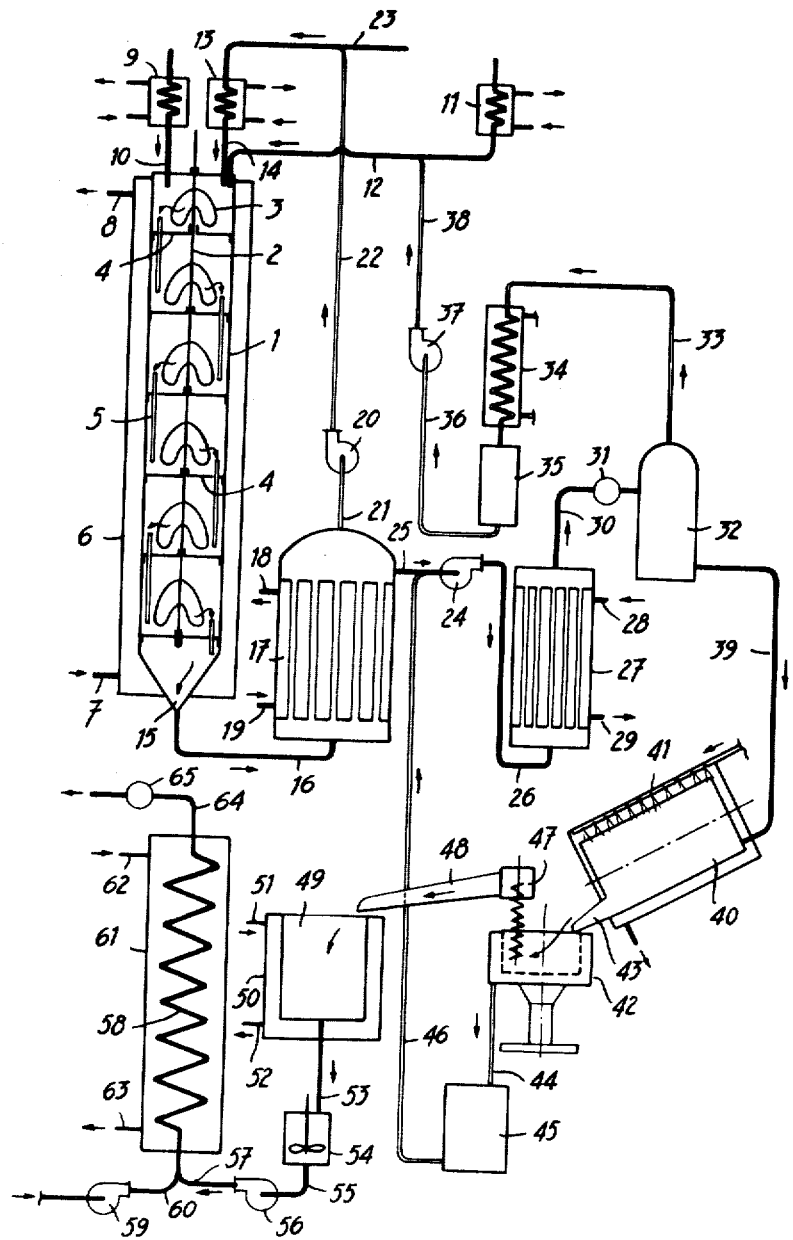

2,913,502
PROCESS FOR THE PREPARATION OF 1,4-DIBROMOBUTANE

John Elian, Uccle-Brussels, and Marcel Lepingle, Schaerbeek-Brussels, Belgium, assignors to Cellulose-Polymeres et Dérivés "Cepede," S.A., Brussels, Belgium and Red-Gesellschaft m.b.H., Technik und Produkte; Cellulose, Chemie und Chemie der Kunststoffe, Hamburg, Germany Application March 20, 1957, Serial No. 647,375

Claims priority, application France March 4, 1957

2 Claims. (Cl. 260—658)

The object of the present invention is a new process for obtaining dibromobutane 1.4 from butadiene.

A further object of the invention concerns the apparatus needed for carrying out this process.

It is a well known fact that it is impossible to obtain 1,4-dibromobutane from butadiene

by a direct process, i.e. through the action of hydrobromic acid, this, because instead of dibromo products only a monobromine substance

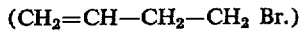

is obtained.

It is further known that by causing bromine to react with butadiene, a mixture of the 1,4-dibromobutene and 1.2-isomers is obtained and that the proportion of both isomers can be modified by heating the mixture.

The new process underlying this invention has for object to make use of these facts to induce the total amount of butadiene involved to be converted to 1,4-dibromobutane.

The new process is characterized by three essential phases. In the first phase of the process, butadiene is acted upon by bromine, at low temperature and in the presence of a solvent, in order to convert the butadiene to a mixture of 1,4-dibromobutene and of 1,2-dibromobutene.

For this purpose, the butadiene, cooled below its evaporation point (approx. −4.5° C.), is introduced into a nonpolar solvent which is also kept at a low temperature. Suitable solvents are chloroform, acetic acid, carbon disulphide and hydrocarbons, such as hexane for instance. The temperature is chosen in such way that the butadiene/solvent mixture is liquid. It varies between +5° and −20° C. The former temperature (+5°) leads to the best results if acetic acid is used, whereas the latter applies when chloroform is used.

The bromine is introduced under constant stirring into the liquid mixture butadiene/solvent. An essential characteristic of the present invention is that the proportions of bromine and butadiene which, theoretically, ought to be equimolecular, are purposely chosen in such way that there should be an excess of butadiene. A slight excess, of 2 to 5%, is enough. Due to this fact, the formation of bromobutene containing more than two bromine atoms per molecule is avoided.

No other compound is formed apart from these 1,4- and 1,2-bromobutenes.

According to the well known procedure which consists in heating the mixture of these substances in a suitable way, the 1,2-isomer is gradually converted into 1,4-isomer. These two isomers are then separated by filtration or centrifugation.

In the second phase of the process, following the separation of isomer-1,2, the latter is reintroduced into the circuit at a point which precedes the stage where the mixture of isomers-1,2 and- 1,4 is raised to the temperature of ab. 90° C. which promotes the formation of isomer-1,4. By following this procedure, which constitutes the second step in the process, the aforementioned mixture is gradually converted altogether to isomer-1,4 whilst the amount of isomer-1,2 remains constant and has no further effect on the yield.

The third step in the process consists in converting the 1,4-bromobutene to 1,4-bromobutane by hydrogenation. This may either be obtained by the action of sodium in alcoholic solution, or by fixation of the hydrogen in the presence of a catalyst such as nickel or palladium. This operation may be performed at atmospheric pressure or under high pressure.

According to the invention, the preparation of 1,4-dibromobutane from butadiene can be performed in a continuous way by applying the process described above and by making use of an apparatus embodying the features of the one which is described below with reference to the appended diagram. The vertical cylinder 1 is provided with a rotating spindle 2 to which are fixed the stirrers 3. Cylinder 1 is subdivided into superposed compartments by fixed trays 4 each of which is fitted with an overflow 5. Cylinder 1 is surrounded by a gas- and watertight jacket 6 through which a cooling mixture is made to flow, entering by tube 7 and flowing-off by tube 8.

Bromine cooled by refrigerator 9, is introduced into cylinder 1 by tube 10; the solvent, cooled by refrigerator 11, is introduced by tube 12, whereas the butadiene, after having been cooled in refrigerator 13 is introduced by tube 14, the rate of flow of the various products being maintained within the proportions which have been mentioned above.

The mixture takes place on the first tray 4, whence it passes down the overflow 5 onto the second tray 4 where the formation of dibromobutene proceeds further, and thus successively from one tray 4 to the next. The sizes of the trays, their numbers and the rate of flow of the original constituents and of the solvent are calculated in such way that the reaction is finished at the lower outlet 15 of cylinder 1. The mixture containing the dibromobutene the solvent and the excess of butadiene is transferred by tube 16 to the heat exchanger 17 in which the water circulates from the inflow 18 to the outflow 19. The butadiene evaporates and is taken-up through tube 21 by the compressor 20 which causes it to flow via tube 22 through aforementioned refrigerator 13. After having been mixed with the butadiene which arrives from the tanks (not shown) through tube 23, it is reintroduced into cylinder 1.

After passing the heat exchanger 17 the liquid mixture consists of 1,2- and 1,4-bromobutenes and of solvent. It is taken-up through tube 25 by the pump 24 which causes it to be transferred by tube 26 to the heat exchanger 27 where it is heated to approximately 95°. In consequence of this heating, the main part of isomer-1,2 is converted to isomer-1,4. Steam is admitted to the heat exchanger by tube 28 and let-off after condensation by tube 29.

On leaving the heat exchanger 27, the mixture passes through tube 30 into the pressure reducing valve 31 where the solvent evaporates. The vapors collected in container 32 are led by tube 33 to condenser 34. The solvent which has thus been recuperated flows into container 35 whence it is taken-up through tube 36 by the pump 37 which causes it to be reintroduced into the circuit by tubes 38 and 12.

All these procedings are connected with the first phase of the process according to the invention. For applying the second phase of the process, the mixture of both dibromobutene isomers, after leaving container 32, is led through tube 39 into a drum 40 which is cooled by a spray of water provided by the perforated tube 41. The temperature of the mixture is thus reduced to less than 50° C., at which temperature isomer-1,4 is solid whereas isomer 1.2 remains in the liquid state. Separation takes place in the centrifuge 42 into which the mixture is fed by the spout 43 connected to the outlet of the cooled drum 40. Isomer 1.2 flows through tube 44 into container 45 whence it is reintroduced into the circuit by tube 46 and pump 24.

Finally, and in order to apply the third phase of the process according to the invention, the solid mass comprising nothing else but isomer-1,4 is picked-up by the Archimedean screw 47 and transferred through the gullet 48 into tank 49. The latter is surrounded by a steam jacket 50 with steam in- and outlets 51 and 52 respectively. Having become liquid again, the 1,4-dibromobutene flows through tube 53 into the mixer 54 where it is mixed with the catalyst. It is then transferred under pressure, via tube 55, pump 56 and tube 57 to the hydrogenation apparatus 58. Hydrogen is introduced into the latter by pump 59 and tube 60. This apparatus is enclosed in cylinder 61 into which steam enters by tube 62 and leaves as condensing water by tube 63. The dibromobutane formed in the hydrogenation apparatus 52 leaves the latter by tube 64 and tap 65. It is then rectified under reduced pressure according to the known process.

What we claim is:

1. A process for producing 1,4-dibromobutane from butadiene comprising continuously brominating said butadiene to form an equilibrium mixture containing 1,4-dibromobutene and 1,2-dibromobutene, converting the same equilibrium mixture by heating to an elevated temperature of about 90–95° C. to increase the amount of 1,4-dibromobutene in said mixture at the expense of the 1,2-dibromobutene in said mixture, continuously separating said 1,4-dibromobutene from said 1,2-dibromobutene by solidification at a temperature of less than 50° C. whereby liquid 1,2-dibromobutene is separated from solid 1,4-dibromobutene, continuously hydrogenating the separated 1,4-dibromobutene to form 1,4-dibromobutane and recycling said separated liquid 1,2-dibromobutene into said equilibrium mixture at a point prior to said converting step.

2. A process as described in claim 1 wherein said bromination of said butadiene is carried out in a solvent and wherein the amount of butadiene is about 2 to 5% molecular excess based upon the amount of bromine to form dibromobutene.

References Cited in the file of this patent
UNITED STATES PATENTS

| | | |
|---|---|---|
| 2,303,663 | Shankland | Dec. 1, 1942 |
| 2,446,475 | Hearne et al. | Aug. 3, 1948 |
| 2,483,049 | Hillyer | Sept. 27, 1949 |
| 2,651,664 | Ladd et al. | Sept. 8, 1953 |

FOREIGN PATENTS

| | | |
|---|---|---|
| 524,507 | Ladd et al. | May 1, 1956 |

OTHER REFERENCES

Muskat et al.: "Jour. Amer. Chem. Soc., October 1930, vol. 52, pp. 4043–4055 (page 4045).